(12) United States Patent
Abani et al.

(10) Patent No.: US 9,995,213 B2
(45) Date of Patent: Jun. 12, 2018

(54) ASYMMETRICALLY-SHAPED COMBUSTION CHAMBER FOR OPPOSED-PISTON ENGINES

(71) Applicant: ACHATES POWER, INC., San Diego, CA (US)

(72) Inventors: Neerav Abani, San Diego, CA (US); Ryan G. MacKenzie, San Diego, CA (US); Rishikesh Venugopal, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 518 days.

(21) Appl. No.: 14/675,407

(22) Filed: Mar. 31, 2015

(65) Prior Publication Data

US 2016/0290224 A1    Oct. 6, 2016

(51) Int. Cl.
*F02B 25/08* (2006.01)
*F02B 75/02* (2006.01)
(Continued)

(52) U.S. Cl.
CPC ............... *F02B 75/02* (2013.01); *F01B 7/14* (2013.01); *F02B 23/066* (2013.01);
(Continued)

(58) Field of Classification Search
CPC .... F02B 75/02; F02B 23/0633; F02B 23/069; F02B 23/0678; F02B 23/066; F02B 75/282; F02B 23/0624; F02B 23/0621; F02B 23/0618; F02B 23/0669; F02B 2075/025; F01B 7/14; F02F 3/00; F02F 3/08; Y02T 10/125
(Continued)

(56) References Cited

U.S. PATENT DOCUMENTS 1,143,408 A    6/1915   Kramer
1,464,268 A    8/1923   Keller
(Continued)

FOREIGN PATENT DOCUMENTS

BE            388676        5/1932
DE    102004010361 A1    12/2004
(Continued)

OTHER PUBLICATIONS

Hofbauer, P., *SAE Publication 2005-01-1548*, "Opposed Piston Opposed Cylinder (opoc) Engine for Military Ground Vehicles," Apr. 2005.
(Continued)

*Primary Examiner* — Hung Q Nguyen
(74) *Attorney, Agent, or Firm* — Terrance A. Meador; Julie J. Muyco

(57) ABSTRACT

A combustion chamber for an opposed-piston engine has an elongated asymmetrical shape in longitudinal section that runs along a chamber centerline, between diametrically-opposed openings of the combustion chamber through which fuel is injected. The asymmetry apportions combustion chamber volume to provide additional clearance on a side of the chamber centerline toward which swirl is directed, thereby giving a fuel plume space to swing without hindrance in response to swirl.

21 Claims, 9 Drawing Sheets

(51) Int. Cl.
 *F02F 3/00* (2006.01)
 *F02B 23/06* (2006.01)
 *F01B 7/14* (2006.01)
 *F02B 75/28* (2006.01)

(52) U.S. Cl.
 CPC ........ *F02B 23/069* (2013.01); *F02B 23/0618* (2013.01); *F02B 23/0621* (2013.01); *F02B 23/0624* (2013.01); *F02B 23/0633* (2013.01); *F02B 23/0678* (2013.01); *F02B 75/282* (2013.01); *F02F 3/00* (2013.01); *F02B 23/0669* (2013.01); *F02B 2075/025* (2013.01); *Y02T 10/125* (2013.01)

(58) Field of Classification Search
 USPC ......... 123/51 R, 51 B, 51 BA, 51 BD, 193.6
 See application file for complete search history.

(56) References Cited

U.S. PATENT DOCUMENTS

| | | | |
|---|---|---|---|
| 1,486,583 A | | 3/1924 | Huskisson |
| 1,515,391 A | | 11/1924 | Keller |
| 1,523,453 A | | 1/1925 | Scott |
| 2,393,085 A | | 1/1946 | Wuehr |
| 2,463,418 A | | 3/1949 | Pescara |
| 2,682,862 A | * | 7/1954 | Camner .............. F02B 3/00 123/276 |
| 2,805,654 A | | 9/1957 | Jacklin |
| 2,853,983 A | | 9/1958 | Sawle |
| 3,583,373 A | * | 6/1971 | Hardenberg ........... F02B 23/08 123/279 |
| 4,452,221 A | | 6/1984 | Keating |
| 4,872,433 A | | 10/1989 | Paul |
| 5,042,441 A | | 8/1991 | Paul et al. |
| 5,327,864 A | * | 7/1994 | Regueiro .............. F02B 17/005 123/260 |
| 6,152,101 A | | 11/2000 | Parsi |
| 6,170,443 B1 | | 1/2001 | Hofbauer |
| 6,182,619 B1 | | 2/2001 | Spitzer |
| 7,234,524 B2 | | 10/2007 | Matas et al. |
| 7,438,039 B2 | | 10/2008 | Poola et al. |
| 7,597,084 B2 | | 10/2009 | Vachon et al. |
| 8,677,950 B2 | | 3/2014 | Hofbauer |
| 8,770,168 B2 | | 7/2014 | Cornwell et al. |
| 8,783,218 B2 | | 7/2014 | Shen et al. |
| 8,800,628 B2 | | 8/2014 | Fuqua et al. |
| 8,820,294 B2 | | 9/2014 | Fuqua et al. |
| 2006/0124084 A1 | | 6/2006 | Hofbauer et al. |
| 2006/0157003 A1 | | 7/2006 | Lemke et al. |
| 2008/0006238 A1 | | 1/2008 | Hofbauer et al. |
| 2008/0115771 A1 | | 5/2008 | Elsbett |
| 2008/0127947 A1 | | 6/2008 | Hofbauer et al. |
| 2009/0159022 A1 | | 6/2009 | Chu |
| 2010/0107868 A1 | | 5/2010 | Scharp et al. |
| 2010/0224162 A1 | | 9/2010 | Hofbauer |
| 2010/0282219 A1 | | 11/2010 | Alonso |
| 2011/0041684 A1 | | 2/2011 | Kortas et al. |
| 2011/0271932 A1 | | 11/2011 | Fuqua et al. |
| 2012/0073526 A1 | | 3/2012 | Dion et al. |
| 2012/0073541 A1 | | 3/2012 | Fuqua et al. |
| 2012/0125298 A1 | | 5/2012 | Lemke et al. |
| 2012/0192831 A1 | | 8/2012 | Tusinean ............ 123/299 |
| 2012/0234285 A1 | | 9/2012 | Venugopal et al. |
| 2012/0285418 A1 | | 11/2012 | Elsbett et al. |
| 2013/0014718 A1 | | 1/2013 | Shen et al. |

FOREIGN PATENT DOCUMENTS

| | | |
|---|---|---|
| DE | 102006055251 A1 | 5/2008 |
| FR | 50349 | 3/1940 |
| GB | 320439 | 10/1929 |
| GB | 531366 | 1/1941 |
| GB | 562343 | 6/1944 |
| GB | 2493260 A | 1/2013 |
| JP | 52004909 A | 1/1977 |
| JP | 2009-138718 | 6/2009 |
| SU | 1216394 A1 | 3/1986 |
| WO | WO-02/48524 A1 | 6/2002 |
| WO | WO-2007/006469 A2 | 1/2007 |
| WO | WO-2009/061873 A1 | 5/2009 |
| WO | WO 2009/061873 A2 | 5/2009 |
| WO | WO-2012/158756 A1 | 11/2012 |
| WO | WO-2014/052126 A1 | 4/2014 |

OTHER PUBLICATIONS

Franke, M., *SAE Publication 2006-01-0277*, "Opposed Piston Opposed Cylinder (opoc) 450 Engine: Performance Development by CAE Simulations and Testing," M. Franke, et al, Apr. 2006.

Hirsch, N.R., et al, *SAE Publication 2006-01-0926*, "Advanced Opposed Piston Two-stroke Diesel Demonstrator," Apr. 2006.

Nternational Search Report/Written Opinion for PCT/US2011/000692, dated Aug. 18, 2011.

International Search Report/Written Opinion for PCT/US2011/001436, dated Nov. 3, 2011.

International Search Report/Written Opinion for PCT/US2012/038061, dated May 16, 2012.

International Search Report/Written Opinion for PCT/US2016/022613, dated Jun. 3, 2016.

* cited by examiner

ASYMMETRICALLY-SHAPED COMBUSTION CHAMBER FOR OPPOSED-PISTON ENGINES

RELATED APPLICATIONS

This application contains subject matter related to the subject matter of the following commonly-owned applications: U.S. Ser. No. 13/066,589, now U.S. Pat. No. 8,800,528; U.S. Ser. No. 13/136,954, now U.S. Pat. No. 8,820,294; U.S. Ser. No. 14/117,831, now U.S. Pat. No. 9,309,807; U.S. Ser. No. 13/843,686, published as US 2013/0213342; U.S. Ser. No. 14/026,931, now U.S. Pat. No. 9,512,779; and U.S. Ser. No. 14/074,580, now U.S. Pat. No. 9,211,797.

FIELD OF THE DISCLOSURE

The field includes opposed-piston engines in which a combustion chamber is defined between end surfaces of pistons disposed in opposition in the bore of a cylinder. More particularly, the field includes opposed-piston engines with combustion chambers having shapes that promote complex, turbulent bulk motion of charge air.

BACKGROUND OF THE DISCLOSURE

The related patent applications describe two-stroke, opposed-piston engines in which pairs of pistons move in opposition in the bores of ported cylinders. During a compression stroke, as two opposed pistons move toward each other in a cylinder bore, a combustion chamber is formed in the bore, between the end surfaces of the pistons. Fuel is injected directly into the volume of the combustion chamber when the pistons are at or near respective top center ("TC") locations in the bore. When the end surfaces are closest to each other, near the end of the compression stroke, minimum combustion chamber volume ("minimum volume") occurs. The fuel is injected through fuel injector nozzles positioned in diametrically-opposed openings through the sidewall of the cylinder. The fuel mixes with charge air admitted into the bore. As the air-fuel mixture is compressed between the piston end surfaces, the compressed air reaches temperature and pressure levels that cause the fuel to ignite; combustion follows. Combustion timing is frequently referenced to minimum volume. In some instances injection occurs at or near minimum volume; in other instances, injection may occur before minimum volume. In any case, in response to combustion the pistons reverse direction and undergo a power stroke. During the power stroke, the pistons move away from each other toward bottom center ("BC") locations in the bore. As the pistons reciprocate between top and bottom center locations they open and close ports formed in respective intake and exhaust locations of the cylinder in timed sequences that control the flow of charge air into, and exhaust from, the cylinder.

In many aspects of piston constructions for two-stroke, opposed-piston engines it is desirable to utilize pistons with crowns having contoured end surfaces that interact with swirl in the cylinder and with squish flow from the periphery of the combustion chamber. The interaction produces complex, turbulent charge air motion that encourages air/fuel mixing. The related applications are directed to opposed-piston applications in which the piston end surfaces define combustion chambers having specific shapes that encourage turbulence. In these applications the combustion chamber is defined between opposed ridges that extend on opposite sides of a chamber centerline that runs between diametrically-opposed openings in the combustion chamber through which fuel is injected; thus the chamber centerline corresponds to a piston diameter D between the openings. In some instances, the ridges are symmetrically curved with respect to the chamber centerline in order to guide air flow and fuel plumes. In longitudinal cross-section, these combustion chambers have the shape of a non-looping simple closed curve centered on the centerline that decreases in area from a central portion toward either opening. At minimum volume, the symmetrical ridge shapes give the combustion chamber space an elongated, generally symmetrically shape in plan which has opposing curved sides and runs along the centerline. The widest portion of the combustion chamber occurs at or near the longitudinal axis of the cylinder (which is collinear with the longitudinal axes of the pistons and transverse to the chamber centerline). From there the combustion chamber space tapers symmetrically in opposing directions to the openings in the combustion chamber. This shape conforms to the configurations of the fuel plumes and guides them as they spread while travelling toward the central portion of the combustion chamber. See, for example, the ellipsoidal shape of the combustion chamber described in U.S. Pat. No. 8,800,528.

Combustion chamber symmetry may in some instances reduce combustion efficiency. The swirl component of charge air tends to urge the plumes of fuel toward respective ridges that define the sides of the combustion chamber, thereby reducing air utilization and hence thermal efficiency. Combustion chamber symmetry may also work against effective control of emissions if swirl pushes the plumes into contact with the sides of the combustion chamber, which can cause partial flame quenching and production of soot. Another possible drawback of symmetry can occur if the plumes ignite while in contact with the sides, which can result in increased heat transfer to the piston crown and risk of crown oxidation.

SUMMARY

The disadvantages with respect to fuel efficiency, emissions reduction, and piston durability are reduced if not eliminated by providing a combustion chamber for an opposed-piston engine having a shape to accommodate both fuel plume spreading and fuel plume movement in response to swirl. In this regard, the combustion chamber has an elongated asymmetrical shape in longitudinal section that runs along a chamber centerline, between diametrically-opposed openings of the combustion chamber through which fuel is injected. The asymmetry apportions combustion chamber so as to provide additional clearance on a side of the chamber centerline toward which swirl is directed, thereby giving a fuel plume space to adequately entrain air in the presence of swirl.

The asymmetrical shape includes a central region and end regions that extend along the chamber centerline and taper asymmetrically from the central region to respective fuel injection openings to the central region. The asymmetrical tapers skew combustion chamber space in the end regions toward respective sides of the chamber centerline.

The combustion chamber is formed as an asymmetrical volume extending along a centerline that extends between diametrically-opposed openings through which fuel is injected into the combustion chamber. There is a maximum radial distance $R_1$ from the chamber centerline to one side of the combustion chamber. $R_1$ is positioned by an asymmetry parameter L that defines a distance along the chamber centerline from a respective opening to a point on either side of the centerline midpoint.

An opposed-piston engine includes at least one cylinder with a bore and longitudinally displaced intake and exhaust ports machined or formed in the cylinder, near respective ends thereof. Two pistons are disposed in the bore with their end surfaces in opposition to each other. A combustion chamber with diametrically opposed openings for admitting fuel is formed between the end surfaces when the pistons are near top center locations in the bore. The volume has an elongated asymmetrical shape that contains a chamber centerline and runs from one to the other of the diametrically-opposed openings. In some aspects, the asymmetrical shape of the combustion chamber volume is defined by piston end surface ridges having inner walls that are asymmetrically curved in a plane of the combustion chamber with respect to the chamber centerline. Further, the shapes of the inner walls are constrained to be polar symmetric with respect to the point at which the longitudinal axis of the cylinder intersects the chamber centerline.

A piston for an opposed-piston engine has a cylindrical sidewall centered on a longitudinal axis and a crown with an end surface including a peripheral edge where the sidewall meets the end surface. The end surface includes a curved ridge that is surrounded by the peripheral edge and protrudes away from the crown through a reference plane that is transverse to the longitudinal axis of the piston and contains the peripheral edge. The curved ridge includes an inner wall that transitions to an elongated cleft (or trench) in the end surface which extends along the diameter of the crown between opposed notches that are aligned with the diameter of the crown and that open through the peripheral edge into respective ends of the cleft. The trench has an asymmetrical shape with respect to the diameter that includes a maximum orthogonal distance $R_1$ from the diameter to the inner wall, in which $R_1$ is positioned a distance L along the diameter on either side of the longitudinal axis.

DETAILED DESCRIPTION OF THE PREFERRED EMBODIMENTS

Figure 1:
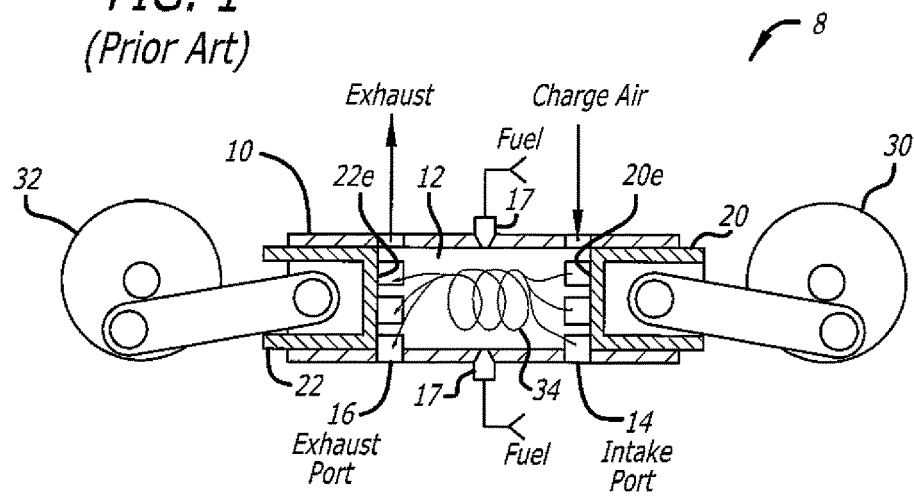
FIG. 1 is a schematic illustration of an opposed-piston engine of the prior art.

Per FIG. 1 an opposed-piston, two-stroke engine 8 includes at least one cylinder 10 with a bore 12 and longitudinally displaced intake and exhaust ports 14 and 16 machined or formed in the cylinder, near respective ends thereof. Each of the intake and exhaust ports includes one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions in FIG. 1.

Fuel injection nozzles 17 are secured in threaded holes that open through the side surface of the cylinder. Two pistons 20, 22 are disposed in the bore 12 with their end surfaces 20e, 22e in opposition to each other. For convenience, the piston 20 is referred to as the "intake" piston because of its proximity to the intake port 14. Similarly, the piston 22 is referred to as the "exhaust" piston because of its proximity to the exhaust port 16. Preferably, but not necessarily, the intake piston 20 and all other intake pistons are coupled to a crankshaft 30 disposed along one side of the engine 8; and, the exhaust piston 22 and all other exhaust pistons are coupled to a crankshaft 32 disposed along the opposite side of the engine 8.

Operation of an opposed-piston engine such as the engine 8 with one or more ported cylinders (cylinders with intake and exhaust ports formed near ends thereof) such as the cylinder 10 is well understood. In this regard, in response to combustion the opposed pistons move away from respective TC positions where they are at their innermost positions in the cylinder 10. While moving from TC, the pistons keep their associated ports closed until they approach respective BC positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times.

As charge air enters the cylinder 10 through the intake port 14, the shapes of the intake port openings cause the air to spiral (or "swirl") about the cylinder's longitudinal axis, in the direction of the exhaust port 16. The swirl vortex 34 thereby formed promotes air/fuel mixing. Swirl velocity increases as the end surfaces 20e and 22e move together. When injection occurs, high velocity swirl can pivot the fuel plumes in the direction of rotation.

Figure 2:
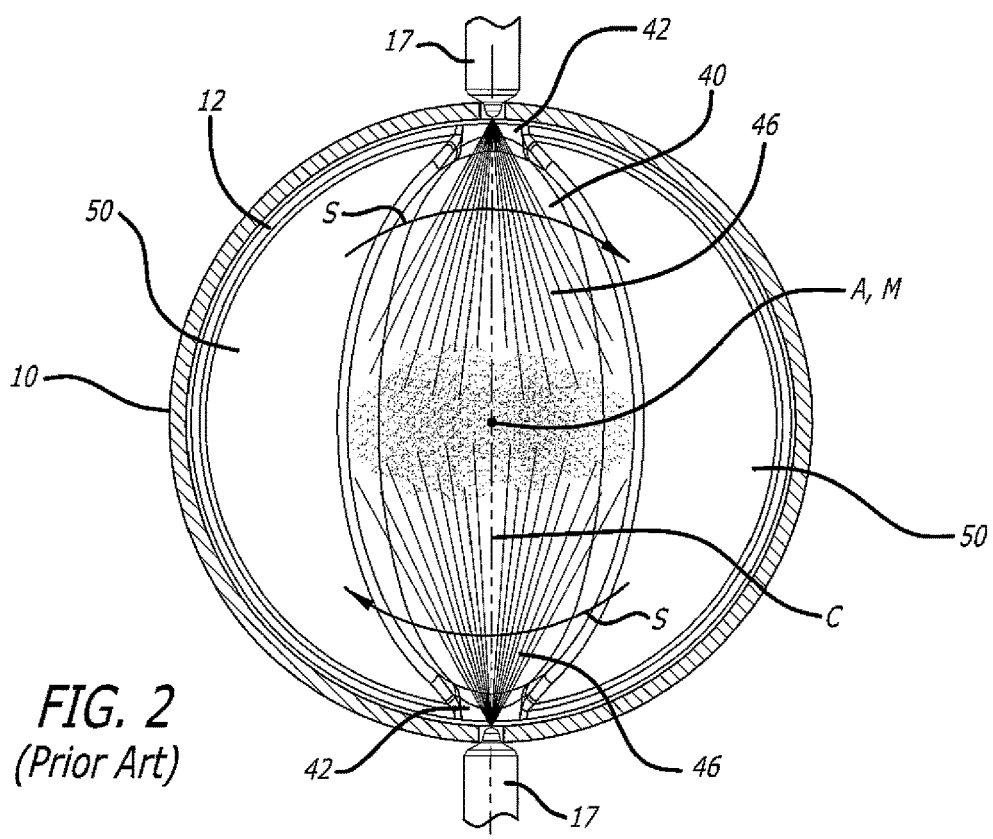
FIG. 2 is a cut plane view of a symmetrically-shaped combustion chamber of the prior art.

FIG. 2 shows opposing fuel plumes and swirl direction in a symmetrically-shaped combustion chamber 40 according to the prior art. The view of FIG. 2 is through an imaginary plane (called a "cut plane" or a "cutting plane") that coincides with the peripheral edge and bisects the combustion chamber at minimum volume. The cut plane contains a combustion chamber centerline C that extends between diametrically-opposed openings 42 through which fuel spray plumes 46 enter the combustion chamber 40. The cut plane and the chamber centerline C are transverse to the longitudinal axis A of the cylinder bore 12. The combustion chamber 40 is defined between piston end surface ridges 50 that pass through the cut plane; in this instance, the ridges 50 are symmetrical in the cut plane with respect to the chamber centerline C. Presume that the bulk air motion in the cylinder bore 12 has a strong swirl component S in the cut plane (which, for example, can be clockwise as shown, or counter clockwise). The swirl S may cause the plumes 46 to swing away from the chamber centerline C. Plumes having relatively low velocity and small droplets of fuel may be swung by swirl in one direction soon after entering the combustion chamber 40, before the midpoint M of the centerline C (which is where the longitudinal axis A intersects the centerline). Plumes comprising high velocity jets and large droplets of fuel may have enough momentum to penetrate farther into the combustion chamber 40 with little initial effect from the swirl but may be swung in the opposite direction as they pass the midpoint M.

Figure 3:
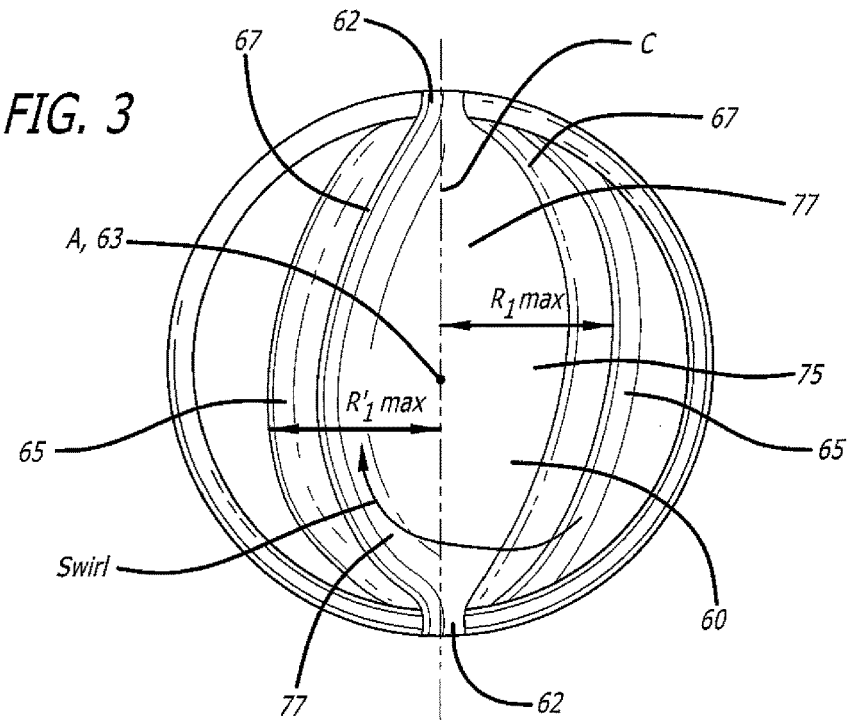
FIG. 3 is a schematic representation of an asymmetrically-shaped combustion chamber according to this disclosure.

The view of FIG. 3 corresponds to that of FIG. 2 with the exception that the volume of the combustion chamber is shaped to accommodate both fuel plume configuration and fuel plume movement in response to air motion according to this disclosure. In this regard, a combustion chamber 60 according to this specification has an elongated asymmetrical shape that extends along the chamber centerline C and runs from one to the other of the diametrically-opposed openings 62 of the combustion chamber 60. The asymmetrical shape of the combustion chamber volume is defined by piston end surface ridges 65 having inner walls 67 that are asymmetrically curved in the cut plane with respect to the chamber centerline C. Further, the shapes of the inner walls 67 are constrained to be polar symmetric with respect to the point at which the longitudinal axis A of the cylinder intersects the chamber centerline C, that is to say at the midpoint 63 of the centerline.

Figure 4:
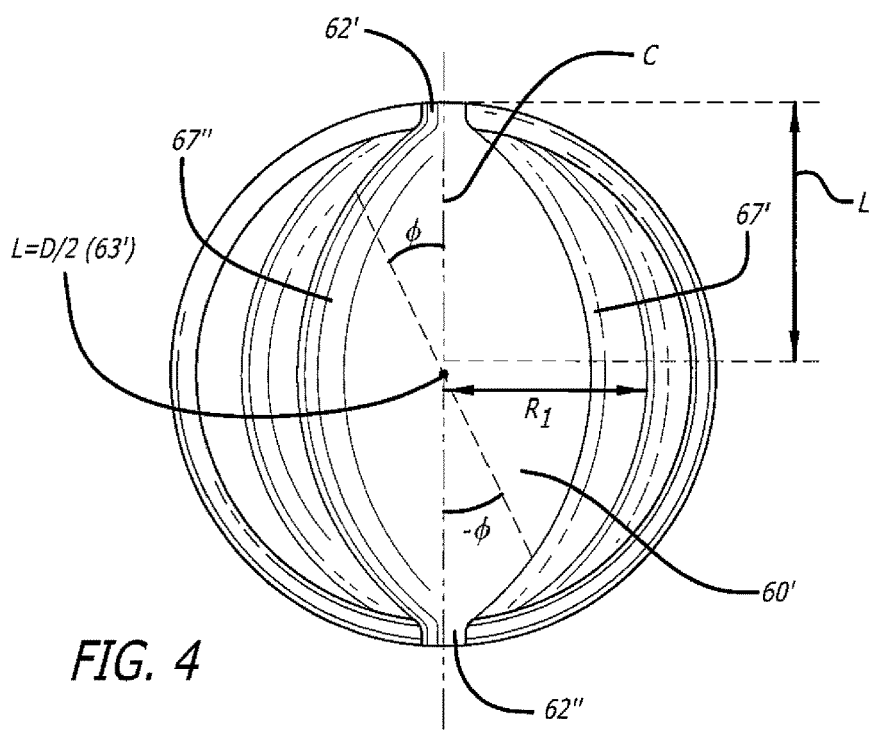
FIG. 4 is a schematic representation of a combustion chamber showing parameterization of combustion chamber asymmetry according to this disclosure.

The asymmetrical shape of a combustion chamber according to this specification is parameterized according to FIG. 4. Using a symmetrical shape as the basis for a model of an asymmetric combustion chamber according to this disclosure, the combustion chamber 60' has a dimension $R_1$ that is radial to the chamber centerline C and measures the distance from the chamber centerline C to the line where the inner wall 67' of a ridge intersects the cut plane. An asymmetry dimension L is collinear with the chamber centerline C and measures the distance from a first opening 62' to a point on the centerline where $R_1$ has a maximum distance ($[R_1]$max) to the inner wall 67' of the ridge. The asymmetry dimension L is also applied to measure an equal distance from the second opening 62" to a point on the centerline C where $R_1'$ has a maximum distance ($[R_1']$max) to the inner wall of the opposing ridge. In a symmetrically-shaped combustion chamber, $[R_1]$max=$[R_1']$max and both occur at L=D/2, measured from the respective openings. For an asymmetrical shape, $[R_1]$max and $[R_1']$max do not occur at L=D/2. Further, at least in the cut plane, the combustion chamber shape is constrained to be polar symmetric with respect to the midpoint 63' of the chamber centerline C, which is where the chamber centerline C and the longitudinal axis of the cylinder intersect (and which is coincident with L=D/2). In this regard, the length of any straight line drawn from the centerline midpoint 63' an angle (θ) to the inner surface of the combustion chamber is equal in length to the inverse of the line drawn from the centerline midpoint 63' at the angle (−θ) to the inner surface of the combustion chamber.

The constraints illustrated in FIG. 4 produce the shape of the combustion chamber 60 illustrated in FIG. 3 which is asymmetrical with respect to the chamber centerline C, but which is polar-symmetrical with respect to the midpoint 63 of the chamber centerline C. In this instance, in the cut plane, $[R_1]$max=$[R_1']$max and each is measured at a distance L from the respective diametrically-opposed openings 62. The resulting shape includes a central region 75 and end regions 77 that extend along the chamber centerline C and taper asymmetrically from the central region 75 to the openings 62. As shown in FIG. 3, the asymmetrical tapers skew combustion chamber space in the end regions toward respective sides of the chamber centerline.

Figure 6:
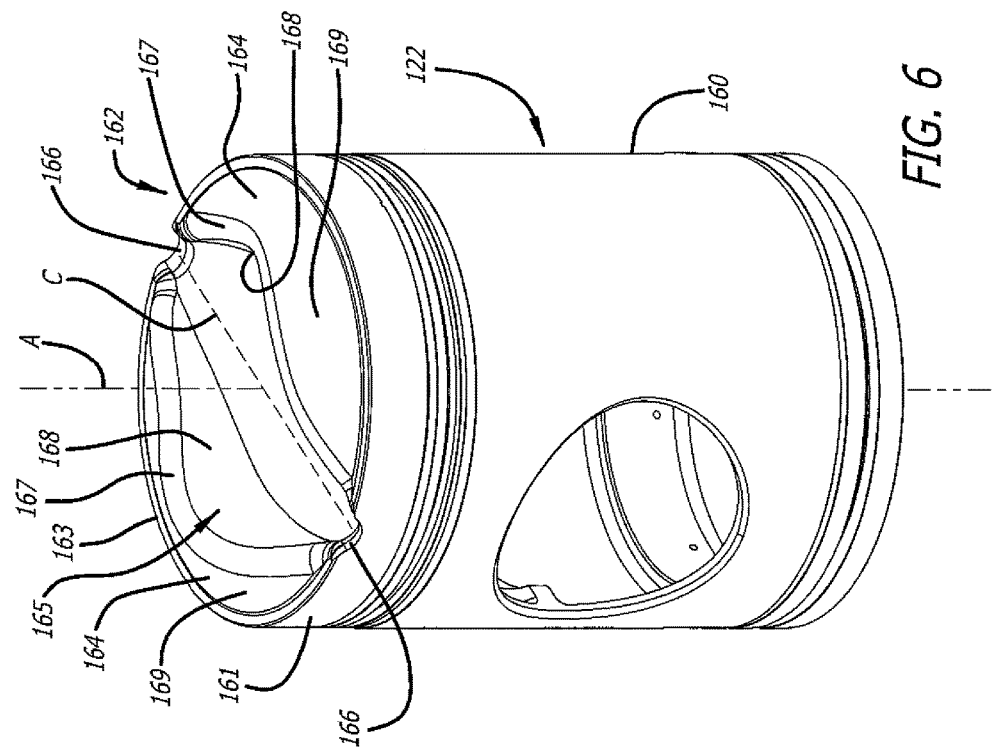
FIGS. 5 and 6 are perspective views of pistons having end surfaces shaped to form an asymmetrically-shaped combustion chamber according to this disclosure.
Figure 5:
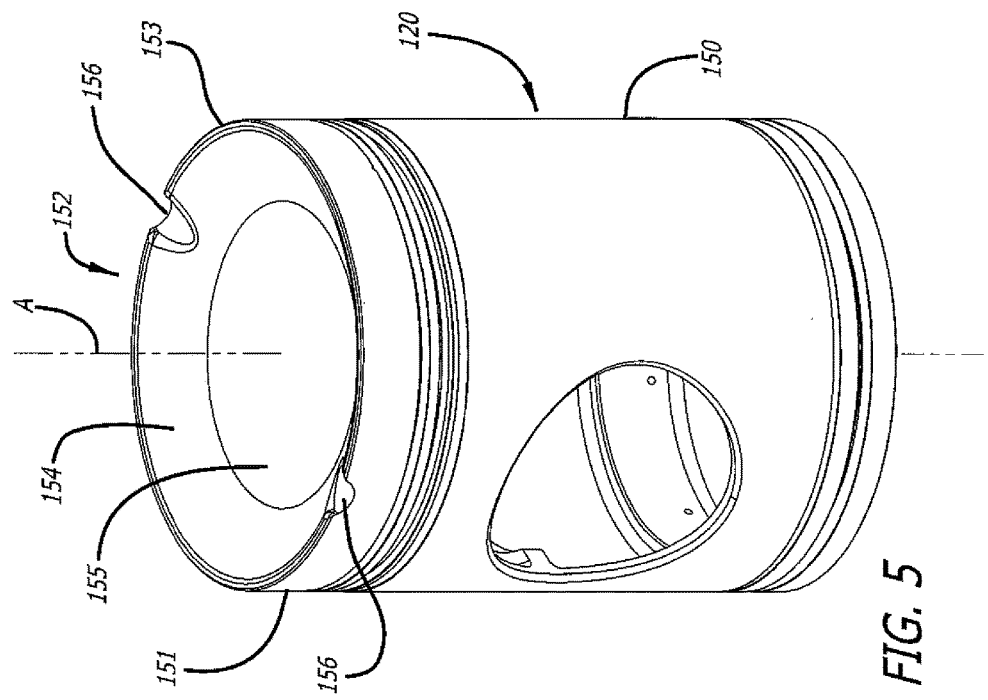

First Construction:

FIGS. 5 and 6 illustrate a pair of pistons 120 and 122 with complementary piston end surface structures for defining a combustion chamber of an opposed-piston engine according to this disclosure. The piston 120 has a cylindrical sidewall 150 centered on a longitudinal axis A and a crown 151 with an end surface 152 including a peripheral edge 153 where the sidewall meets the end surface. The peripheral edge surrounds a bowl 154 in the end surface with a concave surface 155 curving away from the peripheral edge 153 toward the interior of the piston 120. The bowl is preferably rotationally symmetrical about the longitudinal axis A; for example, but without limitation, the concave shape of the bowl can range fro semi-spherical to conical. Diametrically-opposed notches 156 formed in the end surface 152 open through the peripheral edge 153 into the bowl 154.

The other piston 122 has a cylindrical sidewall 160 centered on a longitudinal axis A and a crown 161 with an end surface 162 including a peripheral edge 163 where the sidewall meets the end surface. The peripheral edge surrounds a convex portion 164 protruding outwardly through a piston cut plane that is transverse to the longitudinal axis A of the piston and contains the peripheral edge 163. An elongated cleft 165 is formed between opposing ridges 167 in the convex portion 164. The cleft 165 extends in the end surface along a diametrical combustion chamber centerline C that is collinear with a diameter of the piston. The ends of the cleft 165 include diametrically-opposed notches 166 that open through the peripheral edge 163. Each ridge 167 includes an inner wall 168 that faces the inner wall of the opposite ridge and an outer wall 169 that faces in the direction of the peripheral edge. The outer walls 169 are shaped so as to fit convex portion 164 to the shape of the concave bowl 154 of piston 120.

Figure 7:
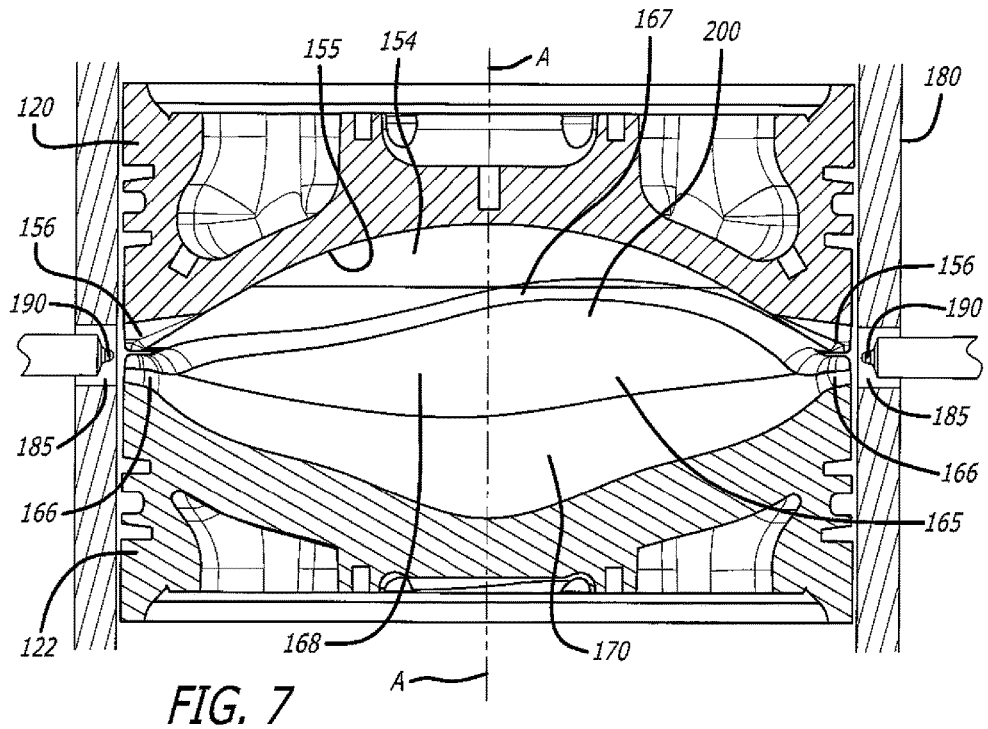
FIGS. 7 and 8 are cross-sectional views of an asymmetrically-shaped combustion chamber formed between the end surfaces of the pistons of FIGS. 5 and 6.
Figure 8:
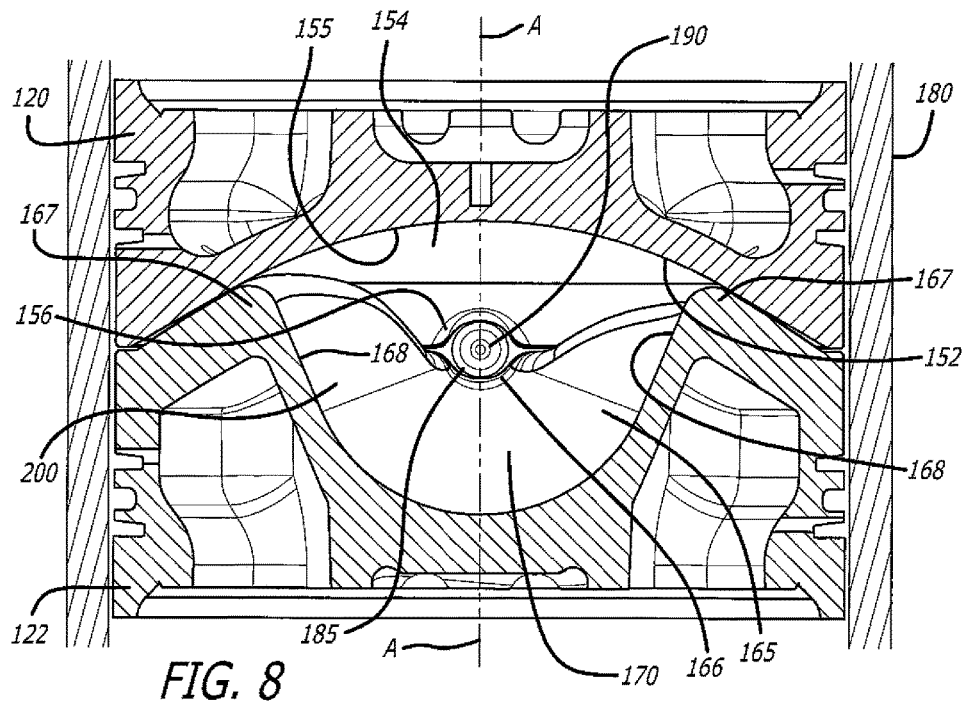

With reference to FIGS. 7 and 8, the two pistons 120 and 122 are shown near TC locations in the bore of a ported cylinder 180. The pistons 120 and 122 are rotationally oriented in the bore so as to align the end surfaces in complement; that is to say, the notches 156 are aligned with the notches 166, and each notch pair 156, 166 is positioned in alignment with a respective fuel injector port 185 that opens through the sidewall of the ported cylinder 180. As the pistons 120 and 122 approach TC, a combustion chamber 200 is defined between their end surfaces. The combustion chamber 200 has a volume defined between the concave surface 155 and the elongated cleft 165.

Figure 9:
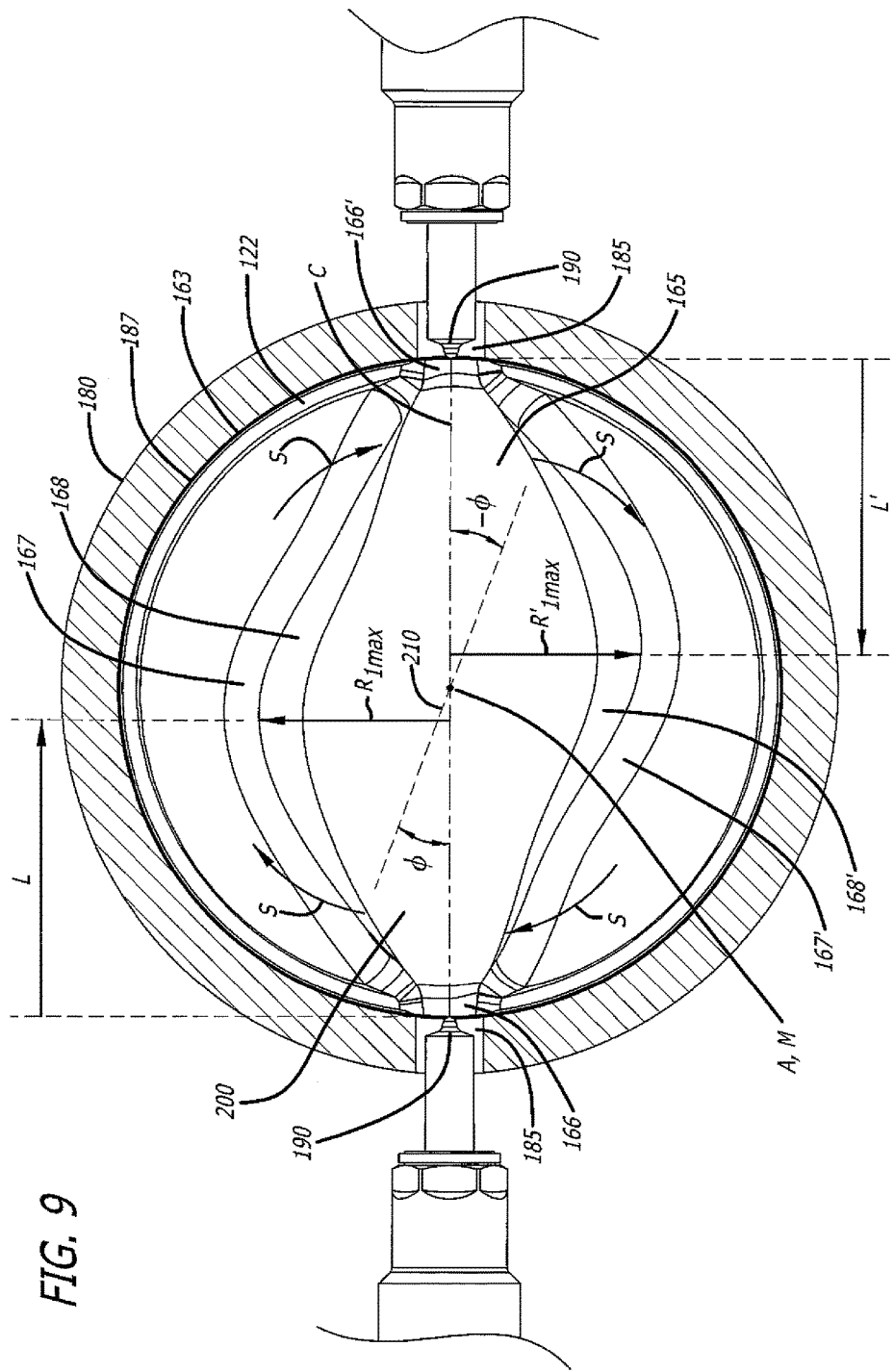
FIG. 9 is a plan view of the end surface of the piston of FIG. 6 at a combustion chamber minimum volume position in a cylinder.

As per FIGS. 7, 8, and 9, the cleft 165 has an elongated, asymmetrical shape in the chamber cut plane that conforms to the asymmetry parameters L and $R_1$. The asymmetrical shape is defined between the inner walls 168 of the ridges 167, which protrude through the piston cut plane and extend into the concave bowl 154 of the piston 120 at minimum volume of the combustion chamber. The inner walls 168 transition inwardly from the piston cut plane to a rounded recess 170. Thus, the inner walls 168 form the opposing sides of the cleft 165 and the surface of the rounded recess 170 forms its floor. As per FIGS. 7 and 8, when the end surfaces are adjacent, the ridges 167 are received in the concave bowl 154, which covers the elongated cleft 165 to define a combustion chamber therewith that conforms to the asymmetry parameters defined above in reference to FIG. 4. As per FIG. 8, in a cross-section across the piston cut plane, the recess 170 between the ridges is rounded; and, at minimum volume, the cross-section of the combustion chamber is in the shape of a non-looping, simple closed curve.

FIG. 9 shows the end surface of the piston 122 when the piston is near its TC location in the bore 187 of the cylinder 180 and the combustion chamber is at minimum volume. The opposing piston 120 and its end surface are removed in order to easily visualize the asymmetry-defining aspects of the combustion chamber. The view is through the cut plane of the combustion chamber that contains the peripheral edge 163 and which serves as a reference plane for the asymmetrical shape of the combustion chamber 200. As is shown, the centerline C of the combustion chamber has a midpoint M where the longitudinal axis A of the piston intersects the centerline and the reference plane. The centerline C corresponds to the diameter of the piston 122; the centerline C also corresponds to a sightline between the tips of the injector nozzles 190 (and the fuel injector ports 185) that extends without obstruction through the combustion chamber 200. The asymmetry of the combustion chamber 200 is defined by L, $R_1$ max and L', $R'_1$ max in which L is the distance along the centerline C from a first notch 166 to a point where the radial distance to an inner wall 168 is maximum (R1 max) and L' is the distance along the centerline C from a second notch 166' to a point where the radial distance to an inner wall 168' is maximum (R'1 max), under the condition that neither point is collocated with M. The resulting asymmetry is constrained by the requirement of polar symmetry with respect to the midpoint M of the combustion chamber shape as represented by the line 210 between the inner walls 168 and 168' in the reference plane.

Figure 10:
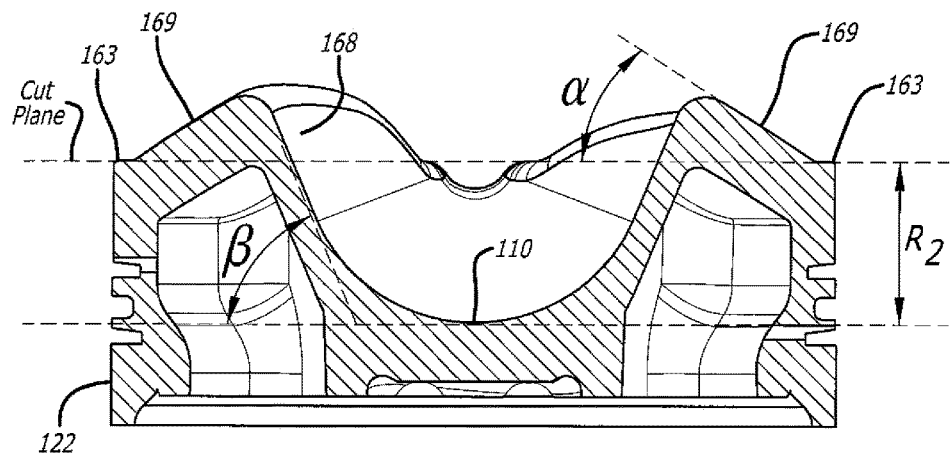
FIG. 10 is cross sectional view of the crown of the piston of FIG. 6 marked to show various combustion bowl parameters.

With the asymmetrical combustion chamber construction illustrated in FIGS. 7-9, combustion performance may be optimized with regard to additional parameters which are listed in Table I and illustrated in FIG. 10. As the asymmetry parameters L and $R_1$ are varied to achieve a target degree of asymmetry, the angle of inclination α of the outer ridge walls 169 of the piston 122 and the shape of the bowl 154 of the piston 120 may be modified to maintain a constant combustion chamber volume and a constant squish clearance matching the mating surfaces between the pistons 120 and 122. The parameters R2 and β may be varied to maintain a target combustion chamber volume (and compression ratio).

TABLE I

| Parameter | Definition |
|---|---|
| $R_1$ | Maximum radial distance from the centerline C to a ridge inner wall 168 |
| L | Distance from an injector tip 190 to a point on the centerline C where $R_{1max}$ occurs |
| α | Angle of inclination of outer ridge wall 169 as measured wrt piston cut plane |
| $R_2$ | Depth of rounded recess 170 wrt the cut plane containing the peripheral edge 163 |
| β | Angle at which a projection of inner wall 168 intersects a tangent to the bottom of rounded recess 170 |

Figure 11:
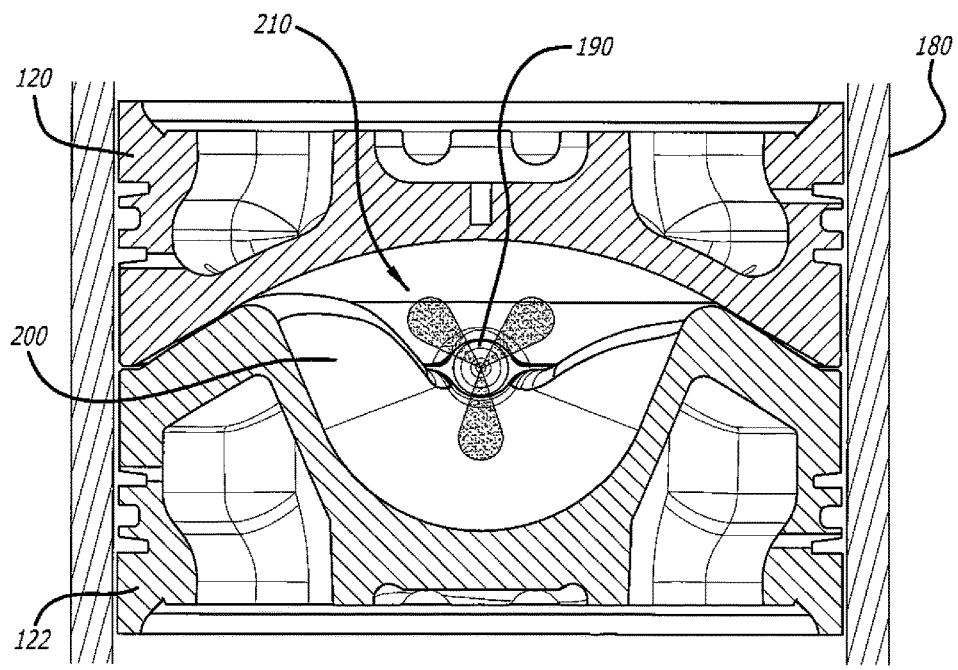
FIG. 11 is cross-sectional view corresponding to FIG. 8 showing injection of a multi-hole spray pattern into the combustion chamber.
Figure 12:
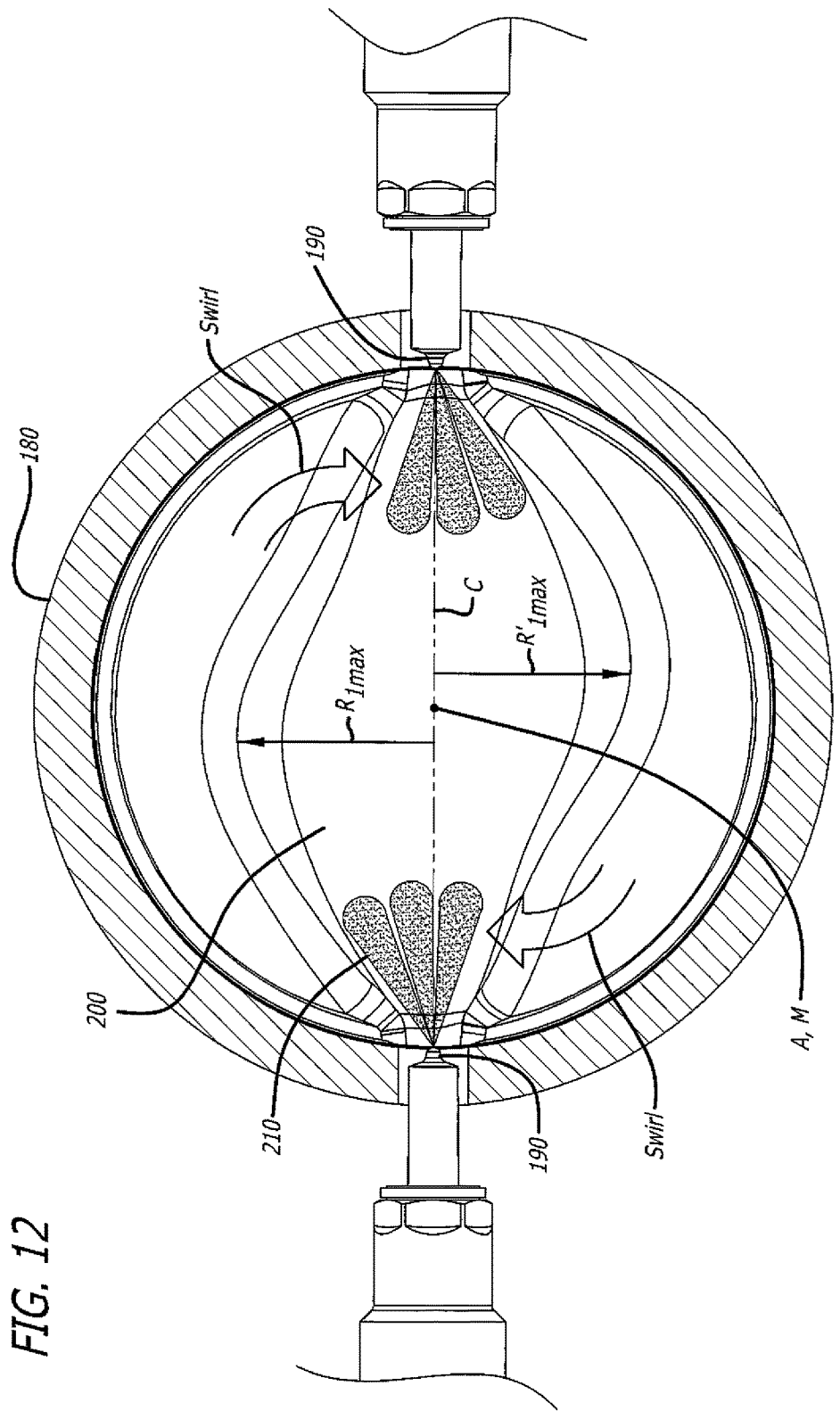
FIG. 12 is a plan view corresponding to FIG. 9 showing injection of opposing multi-hole spray patterns injected along the centerline of the combustion chamber.

With reference to FIGS. 11 and 12, fuel injections into an asymmetrically-shaped combustion chamber according to this specification are preferably in the form of multi-plume spray patterns. For example, each spray pattern may comprise three plumes emitted by a three-hole injector (a "3-hole spray pattern") or four plumes emitted by four-hole injectors (a "4-hole spray pattern"). In other cases the spray patterns may include more or fewer plumes. Multi-plume spray patterns may be radial and symmetrical about the longitudinal axis of an injector, but they may also be asymmetrical in nature. Each plume is emitted from a respective hole in an injector nozzle 190 and has the general shape of a cone. FIGS. 11 and 12 illustrate injection of opposed 3-hole spray patterns 210 through the nozzles 190 along the centerline C of the combustion chamber 200. The centerline C also corresponds to a sightline between the tips of the injector nozzles 190 that extends, without obstruction, through the combustion chamber 200. In FIG. 12, note particularly the responses of the opposing spray patterns to swirl (which is somewhat exaggerated to illustrate the point), wherein the spray patterns are swung by the swirl toward the portions of the combustion chamber with greater clearance due to the asymmetrical shape of the chamber.

The Alpha parameter (α) of Table I represents the angle of the outer ridge wall 169. Modeling of combustion chamber fluid flow has indicated that, as α decreases, the component of the squish flow velocity contributing to tumble increases, but the swirling flow in the combustion chamber increases as well. The net result is higher swirl-to-tumble ratios for smaller values of α. The modeling suggests that a wider 4-hole spray pattern prefers higher tumble and lower swirl, and hence may mix better at larger values of α; on the other hand, the modeling suggests that a 3-hole spray pattern performs better at smaller values of α that result in a higher swirl-to-tumble ratio. For the same total flow area, each plume of the 3-hole spray pattern has greater momentum and penetration into the combustion chamber, which results in greater plume-plume interactions between the opposing spray patterns. Accordingly, a more swirl dominated flow field enhances late cycle mixing and shortens the burn duration for the 3-hole spray pattern.

Fluid flow modeling has indicated that larger values of L that cause the asymmetry in the bowl shape to orient against the swirl plumes result in more swirl-dominated flow fields. These trends consequently suggest that 3-hole spray patterns prefer larger values of L and 4-hole patterns prefer smaller values of L.

These parameters suggest other possible beneficial tradeoffs, including ISFC/NOx, soot/NOx, piston end surface hot spots/NOx, and so on.

Figure 13:
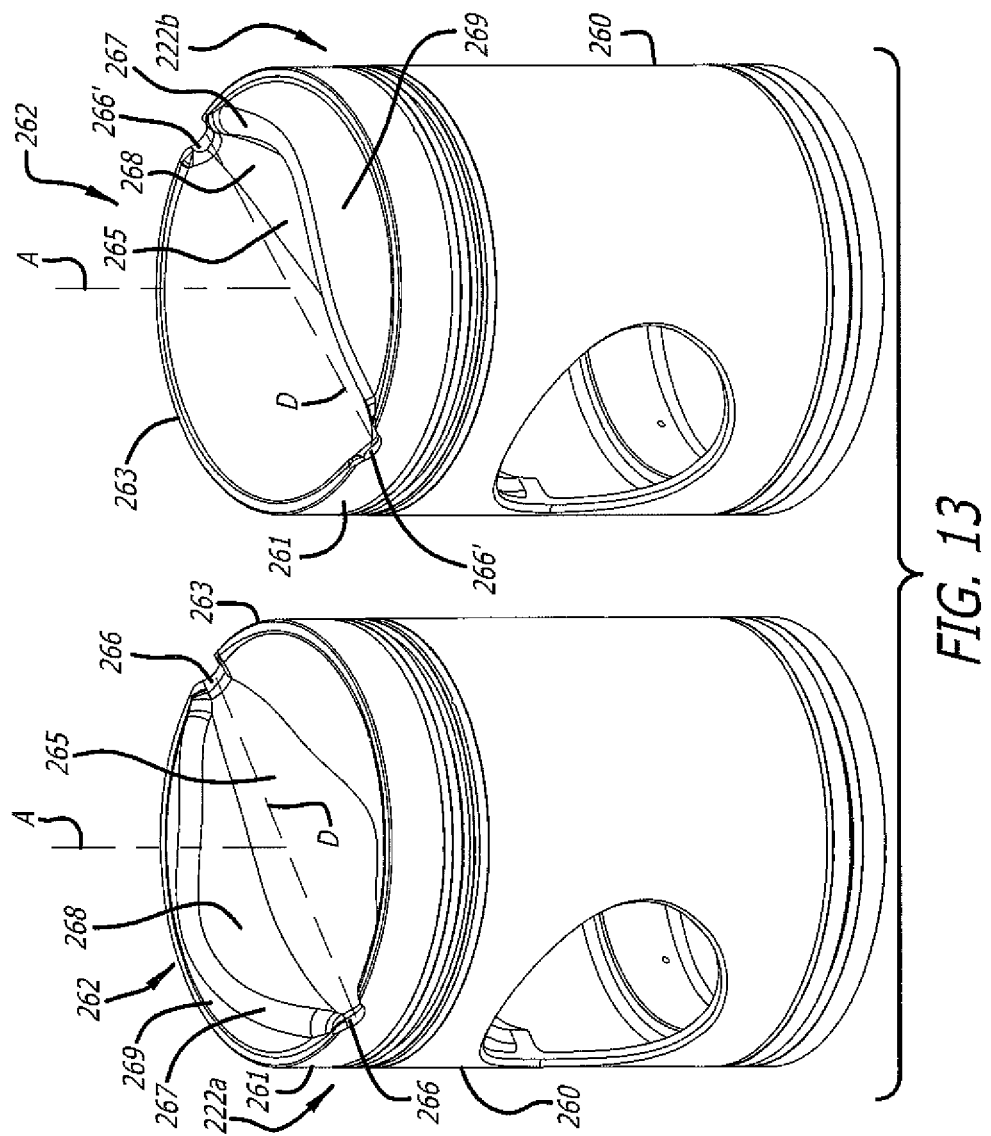
FIG. 13 is a perspective view of two pistons having identical end surfaces shaped to form an asymmetrically-shaped combustion chamber according to this disclosure.

Second Construction:

FIG. 13 illustrates a second construction for an asymmetrically-shaped combustion chamber which is defined by complementary end surface structures of two identically-constructed pistons 222a and 222b disposed in a ported cylinder of an opposed piston engine with their end surfaces in opposition. Each of the pistons 222a and 222b has a cylindrical sidewall 260 centered on a longitudinal axis A and a crown 261 with an end surface 262 including a peripheral edge 263 where the sidewall meets the end surface. The peripheral edge surrounds an elongated concave bowl 265 bordered on one side by a ridge 267 and on another side by a portion of the peripheral edge 263. The ridge 267 protrudes outwardly through a piston cut plane that is transverse to the longitudinal axis A of the piston and contains the peripheral edge 263. The bowl 265 extends in the end surface along a diametric centerline D of the piston. The ends of the bowl 265 include diametrically-opposed notches 266 that open through the peripheral edge 263. The ridge 267 includes an inner wall 268 that transitions to the bowl 265 and an outer wall 269 that faces in the direction of the peripheral edge 263. The inner wall 268 has an elongated, asymmetrical shape in the piston cut plane that conforms to the asymmetry parameters L and $R_1$ as described above. The inner wall 268 transitions inwardly from the piston cut plane to the bowl 265.

Figure 14:
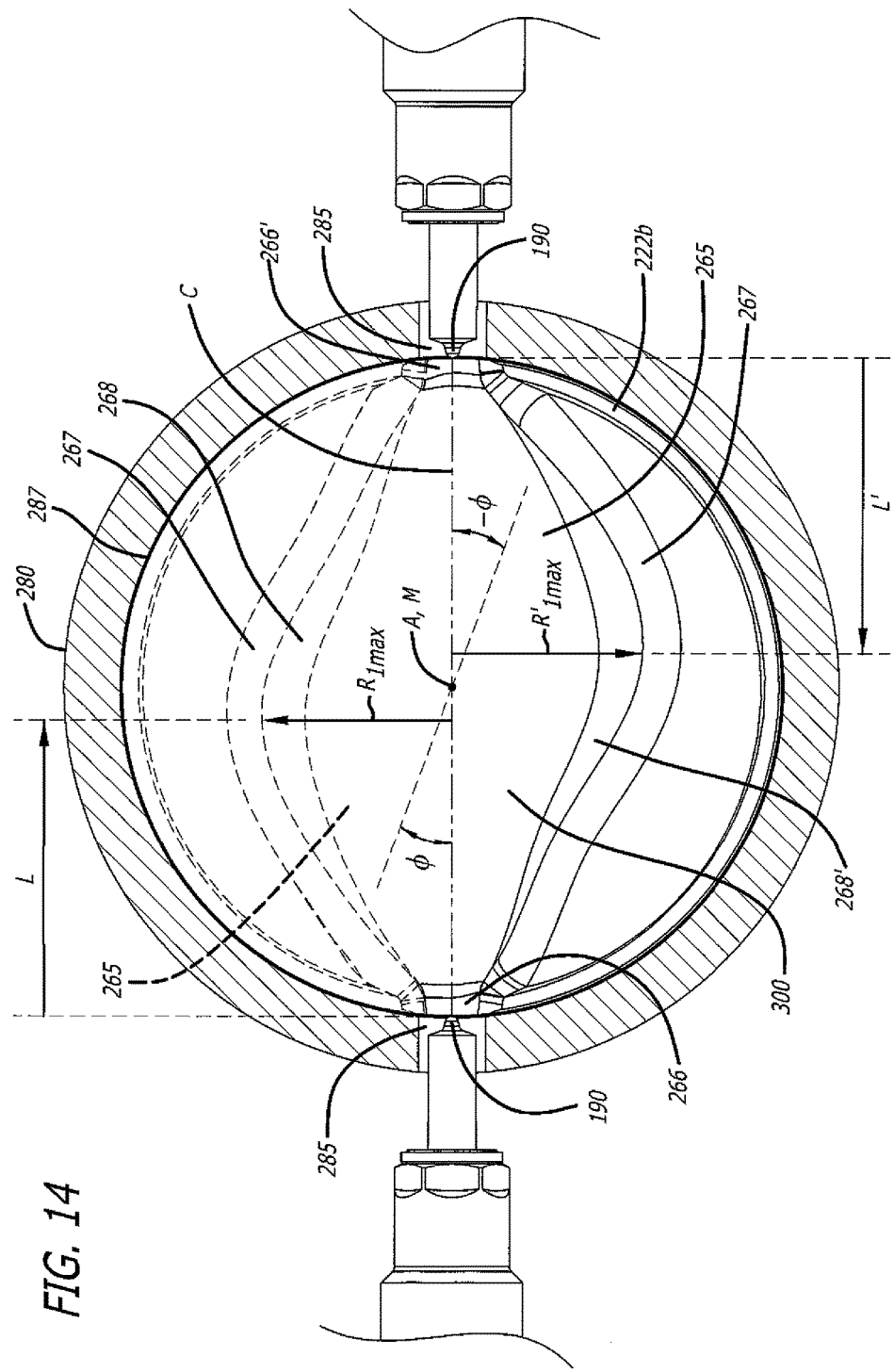
FIG. 14 is a plan view of the end surface of one piston of FIG. 13 at a combustion chamber minimum volume position in a cylinder.

With reference to FIGS. 13 and 14, presume that the two pistons 222a and 222b are at or near TC locations in the bore of a ported cylinder 280. The pistons are rotationally oriented in the bore 287 of the cylinder so as to align their end surfaces in complementary fashion in which the ridges 267 are in opposing alignment with their inner walls facing each other and the notches 266 of the piston 222a are aligned with the notches 266' of the piston 222b. Further, each notch pair 266, 266' is positioned in alignment with a respective injector port 285 that opens through the sidewall of the ported cylinder 280. As the pistons 222a and 222b approach TC, a combustion chamber 300 is defined between the end surfaces 262. The combustion chamber 300 has an asymmetrically-shaped volume defined between the ridge inner walls 268 and the elongated concave bowls 265.

FIG. 14 shows the end surface of the piston 222b when the piston is near its TC location in the bore 287 of the cylinder 280 and the combustion chamber is at minimum volume. The opposing piston 222a and its end surface are removed; however, the ridge 267 of the piston 222a (which defines the combustion chamber with the opposing ridge on the end surface of the piston 222b) is represented by the dashed lines in order to easily visualize the asymmetry-defining aspects of the combustion chamber. The view is through the cut plane of the combustion chamber 300 at minimum volume. As is shown, the centerline C of the combustion chamber has a midpoint M where the longitudinal axis A of the piston intersects the centerline and the reference plane. The centerline C corresponds to the diameter of the piston 222b; the centerline C corresponds to a sightline between the tips of the injector nozzles 190 that extends without obstruction through the combustion chamber. The asymmetry of the combustion chamber 300 is defined by L, $R_1$ max and L', $R'_1$ max in which L is the distance along the centerline C from a first notch 266 to a point where the radial distance to an inner wall 268 is maximum ($R_1$ max) and L' is the distance along the centerline C from a second notch 266' to a point where the radial distance to an inner wall 268' is maximum ($R'_1$ max), under the condition that neither point is collocated with M. The resulting asymmetry is constrained by the requirement of polar symmetry with respect to the midpoint M of the combustion chamber shape between the inner walls 268 and 268' in the reference plane.

The pistons and associated cylinder are manufactured by casting and/or machining metal materials. For example, the pistons may be constituted of a skirt assembled to a crown on which a piston end surface is formed. As a further example, but without excluding other materials, the crown may comprise a high carbon steel such as SAE 4140 or SAE 4340, and the skirt may be formed using cast aluminum or cast or formed steel. In such cases, the cylinder preferably, but not necessarily, comprises a liner with a cast iron composition that is received in a cylinder tunnel formed in a cylinder block.

Although principles of piston and combustion chamber constructions have been described with reference to presently preferred embodiments, it should be understood that various modifications can be made without departing from the spirit of the described principles. Accordingly, the scope of patent protection accorded to these principles is limited only by the following claims.

The invention claimed is:

1. An opposed-piston engine including at least one cylinder with a bore, piston-controlled exhaust and intake ports near respective ends of the cylinder, and a pair of pistons disposed in opposition in the bore, in which:
   each piston has a crown with an end surface defining a combustion chamber in the cylinder bore with the end face of the other piston when the pistons are near top center locations in the bore; and,
   the combustion chamber has an asymmetrical shape with respect to a chamber centerline that extends between diametrically opposing openings of the combustion chamber through which fuel is injected; wherein,
   the asymmetrical shape includes a maximum distance $R_1$ from the chamber centerline to one side of the combustion chamber;
   $R_1$ is positioned a distance L along the chamber centerline on either side of a midpoint of the centerline; and,
   the asymmetrical shape is polar symmetric with respect to the midpoint of the centerline and provides clearance on a side of the combustion chamber centerline toward which swirl is directed, thereby giving a fuel plume space to entrain air in the presence of swirl, accommodating both fuel plume spreading and fuel plume movement in response to swirl.

2. The opposed-piston engine of claim 1, in which the cylinder includes a pair of diametrically opposed fuel injector ports with which the opposed openings of the combustion chamber align when the pistons are near the respective top center locations.

3. The opposed-piston engine of claim 2, in which the opposing openings provide a sightline between the fuel injector ports that extends without obstruction through the combustion chamber.

4. The opposed-piston engine of claim 3, further including a fuel injector with a multi-hole nozzle mounted in each of the fuel injector ports.

5. The opposed-piston engine of claim 1, in which the combustion chamber is defined between a bowl in the end surface of a first piston of the pair of pistons and inner walls of ridges that protrude from the end surface of a second piston of the pair of pistons, further in which the combustion chamber's asymmetrical shape is polar symmetric with respect to the centerline midpoint in a reference plane that is transverse to the longitudinal axis of the at least one cylinder and that bisects the combustion chamber.

6. The opposed-piston engine of claim 5, in which the cylinder includes a pair of diametrically opposed fuel injector ports with which the opposed openings of the combustion chamber align when the pistons are near the respective top center locations.

7. The opposed-piston engine of claim 6, in which the opposing openings provide a sightline between the fuel injector ports that extends without obstruction through the combustion chamber.

8. The opposed-piston engine of claim 7, further including a fuel injector with a multi-hole nozzle mounted in each of the fuel injector ports.

9. An opposed-piston engine including at least one cylinder with a bore, piston-controlled exhaust and intake ports near respective ends of the cylinder, and a pair of pistons disposed in opposition in the bore, in which:
   each piston has a crown with an end surface defining a combustion chamber in the cylinder bore with the end face of the other piston when the pistons are near top center locations in the bore; and,
   the combustion chamber has an asymmetrical shape with respect to a chamber centerline that extends between diametrically opposing openings of the combustion chamber through which fuel is injected; wherein,
   the asymmetrical shape includes a maximum distance $R_1$ from the chamber centerline to one side of the combustion chamber;

$R_1$ is positioned a distance L along the chamber centerline on either side of a midpoint of the centerline;

the asymmetrical shape is polar symmetric with respect to the midpoint of the centerline; and the combustion chamber is defined between a first piston end surface on a first piston of the pair of pistons, the first piston end surface including a ridge having an inner wall that transitions to an elongate bowl and a second piston end surface on a second piston of the pair of pistons, the second piston end surface including a ridge having an inner wall that transitions to an elongate bowl.

10. The opposed-piston engine of claim 9, in which the cylinder includes a pair of diametrically opposed fuel injector ports with which the opposed openings of the combustion chamber align when the pistons are near the respective top center locations.

11. The opposed-piston engine of claim 10, in which the opposing openings provide a sightline between the fuel injector ports that extends without obstruction through the combustion chamber.

12. The opposed-piston engine of claim 11, further including a fuel injector with a multi-hole nozzle mounted in each of the fuel injector ports.

13. A two-stroke, direct injection, opposed-piston engine including a cylinder with a bore, piston-controlled exhaust and intake ports near respective ends of the cylinder, and a pair of pistons disposed in opposition in the bore, in which each piston has a crown with an end surface and a sidewall, the end surface and sidewall meeting at a circular peripheral edge centered on an axis of the piston, and the end surface defining a combustion chamber in the cylinder bore with the end face of the other piston when the pistons are near top center locations in the bore; wherein, the combustion chamber has an asymmetrical shape defined between first and second end surface ridges positioned on either side of a chamber centerline that extends between diametrically opposing points of the bore;

the asymmetrical shape includes a maximum distance $R_1$ from the chamber centerline to one side of the combustion chamber;

$R_1$ is positioned a distance L along the chamber centerline on either side of a centerline midpoint; and, the asymmetrical shape has polar symmetry with respect to a point on a longitudinal axis of the bore in a plane that is transversal to the longitudinal axis and that bisects the combustion chamber and provides clearance on a side of the chamber centerline toward which swirl is directed, thereby giving a fuel plume space to entrain air in the presence of swirl, accommodating both fuel plume spreading and fuel plume movement in response to swirl.

14. The two-stroke, direct injection, opposed-piston engine of claim 13, in which the combustion chamber is defined between a bowl in the end surface of a first piston of the pair of pistons and inner walls of ridges that protrude from the end surface of a second piston of the pair of pistons.

15. A two-stroke, direct injection, opposed-piston engine including a cylinder with a bore, piston-controlled exhaust and intake ports near respective ends of the cylinder, and a pair of pistons disposed in opposition in the bore, in which each piston has a crown with an end surface and a sidewall, the end surface and sidewall meeting at a circular peripheral edge centered on an axis of the piston, and the end surface defining a combustion chamber in the cylinder bore with the end face of the other piston when the pistons are near top center locations in the bore; wherein, the combustion chamber has an asymmetrical shape defined between first and second end surface ridges positioned on either side of a chamber centerline that extends between diametrically opposing points of the bore;

the asymmetrical shape includes a maximum distance $R_1$ from the chamber centerline to one side of the combustion chamber;

$R_1$ is positioned a distance L along the chamber centerline on either side of a centerline midpoint;

the asymmetrical shape has polar symmetry with respect to a point on a longitudinal axis of the bore in a plane that is transversal to the longitudinal axis and that bisects the combustion chamber; and the combustion chamber is defined between a first piston end surface on a first piston of the pair of pistons, the first piston end surface including a ridge having an inner wall that transitions to an elongate bowl and a second piston end surface on a second piston of the pair of pistons, the second piston end surface including a ridge having an inner wall that transitions to an elongate bowl.

16. A piston for an opposed-piston engine, the piston including a longitudinal axis and comprising:

an end surface having a shape that defines a combustion chamber with the end surface of an opposing piston in a cylinder bore of the opposed-piston engine;

a circular sidewall centered on the piston's longitudinal axis and extending from the end surface;

a circular peripheral edge where the sidewall meets the end surface;

notches in the peripheral edge at respective ends of a diameter of the peripheral edge, through which fuel is injected into the combustion chamber; and, the shape of the end surface includes at least one elongated ridge that extends between the notches and projects through a reference plane that is transverse to the longitudinal axis and contains the peripheral edge;

the at least one elongated ridge including an outer wall that faces the peripheral edge and an inner wall that faces the diameter;

in which the combustion chamber formed by the inner wall of the at least one elongated ridge has an asymmetric cross-section in the plane of reference with respect to the diameter of the periphery; and, in which a curvature of the inner wall in the plane of reference is polar-symmetric with a curvature of an inner wall of an opposing ridge with respect to a midpoint of the diameter.

17. The piston for an opposed-piston engine of claim 16, in which the shape includes two ridges having inner walls that transition to a cleft between the ridges that extends between the notches.

18. The piston for an opposed-piston engine of claim 16, in which the shape includes only one ridge and the shape is identical to the end surface shape of the opposing piston.

19. A method for operating an opposed-piston engine including a cylinder, a pair of opposed pistons in the bore of the cylinder and spaced-apart intake and exhaust ports controlled by the pistons, by:

introducing swirling charge air into the cylinder between end surfaces of the pistons;

moving the pistons toward each other in a compression stroke;

forming a combustion chamber between the end surfaces of the pistons, the combustion chamber having an asymmetrical shape with respect to a chamber centerline that extends between diametrically opposing openings of the combustion chamber, wherein:

the asymmetrical shape includes a maximum distance $R_1$ from the chamber centerline to one side of the combustion chamber, $R_1$ is positioned a distance L along the chamber centerline on either side of a midpoint of the centerline, and the asymmetrical shape is polar symmetric with respect to the midpoint of the centerline and provides clearance on a side of the combustion chamber centerline toward which swirl is directed, thereby giving a fuel plume space to entrain air in the presence of swirl, accommodating both fuel plume spreading and fuel plume movement in response to swirl; and, injecting opposing spray patterns of fuel into swirling charge air in the combustion chamber through the opposing openings.

20. The method of claim 19, wherein each of the spray patterns has three plumes.

21. The method of claim 19, wherein each of the spray patterns has four plumes.

\* \* \* \* \*